United States Patent
Uozumi et al.

(10) Patent No.: US 8,403,251 B2
(45) Date of Patent: Mar. 26, 2013

(54) TENSION CONTROL SYSTEM FOR FIBER BUNDLES IN FILAMENT WINDING APPARATUS

(75) Inventors: Tadashi Uozumi, Kyoto (JP); Motohiro Tanigawa, Kyoto (JP)

(73) Assignee: Murata Machinery, Ltd, Kyoto (JP)

( * ) Notice: Subject to any disclaimer, the term of this patent is extended or adjusted under 35 U.S.C. 154(b) by 177 days.

(21) Appl. No.: 12/488,414

(22) Filed: Jun. 19, 2009

(65) Prior Publication Data

US 2009/0314872 A1 Dec. 24, 2009

(30) Foreign Application Priority Data

Jun. 20, 2008 (JP) ................................. 2008-161458
Feb. 17, 2009 (JP) ................................. 2009-034071

(51) Int. Cl.
*B65H 59/24* (2006.01)
(52) U.S. Cl. .................. 242/419.3; 242/419.4; 242/563; 242/147 A; 242/151
(58) Field of Classification Search .................. 242/416, 242/419, 419.1, 419.3, 419.4, 419.5, 563, 242/147 A, 148, 149, 151, 437, 438, 439.4, 242/439.5, 440.1, 441.2, 443, 444, 445.1; 156/169, 172, 173, 175, 425, 429, 432, 161, 156/64, 361

See application file for complete search history.

(56) References Cited

U.S. PATENT DOCUMENTS

| | | | | |
|---|---|---|---|---|
| 3,201,298 A | * | 8/1965 | Baker et al. | 156/431 |
| 4,245,794 A | * | 1/1981 | Hasegawa et al. | 242/413.3 |
| 4,429,842 A | * | 2/1984 | Kupper | 242/149 |
| 4,809,927 A | * | 3/1989 | Colli et al. | 242/150 R |
| 5,109,690 A | * | 5/1992 | Taniguchi et al. | 72/206 |
| 5,928,579 A | * | 7/1999 | Spahlinger et al. | 264/40.1 |
| 2005/0133653 A1 | * | 6/2005 | Heaney et al. | 242/410 |

FOREIGN PATENT DOCUMENTS

| | | | |
|---|---|---|---|
| JP | 61-265170 | | 11/1986 |
| JP | 02231372 A | * | 9/1990 |
| JP | 2003-206071 | | 7/2003 |
| JP | 2007-260974 | | 10/2007 |

OTHER PUBLICATIONS

Machine Translation of JP-2007260974.*
Translation of JP 02231372 A.*

* cited by examiner

*Primary Examiner* — William E Dondero
(74) *Attorney, Agent, or Firm* — DLA Piper LLP (US)

(57) ABSTRACT

A filament winding apparatus detects that a fiber bundle is likely to break and prevents generation of defective products. The filament winding apparatus applies a prescribed winding tension to the fiber bundle unwound from a fiber bundle feeding package and winds the tension-applied fiber bundle around a mandrel. A tension applying portion applies the winding tension to the fiber bundle at a position that is immediately before a side of the mandrel between the fiber bundle package and the mandrel. A tension sensor detects the tension of the fiber bundle between the fiber bundle feeding package and the tension applying portion. A determination means determines a tension abnormality of the fiber bundle by comparing pre-set reference information with the tension measured value measured by the tension sensor.

18 Claims, 12 Drawing Sheets

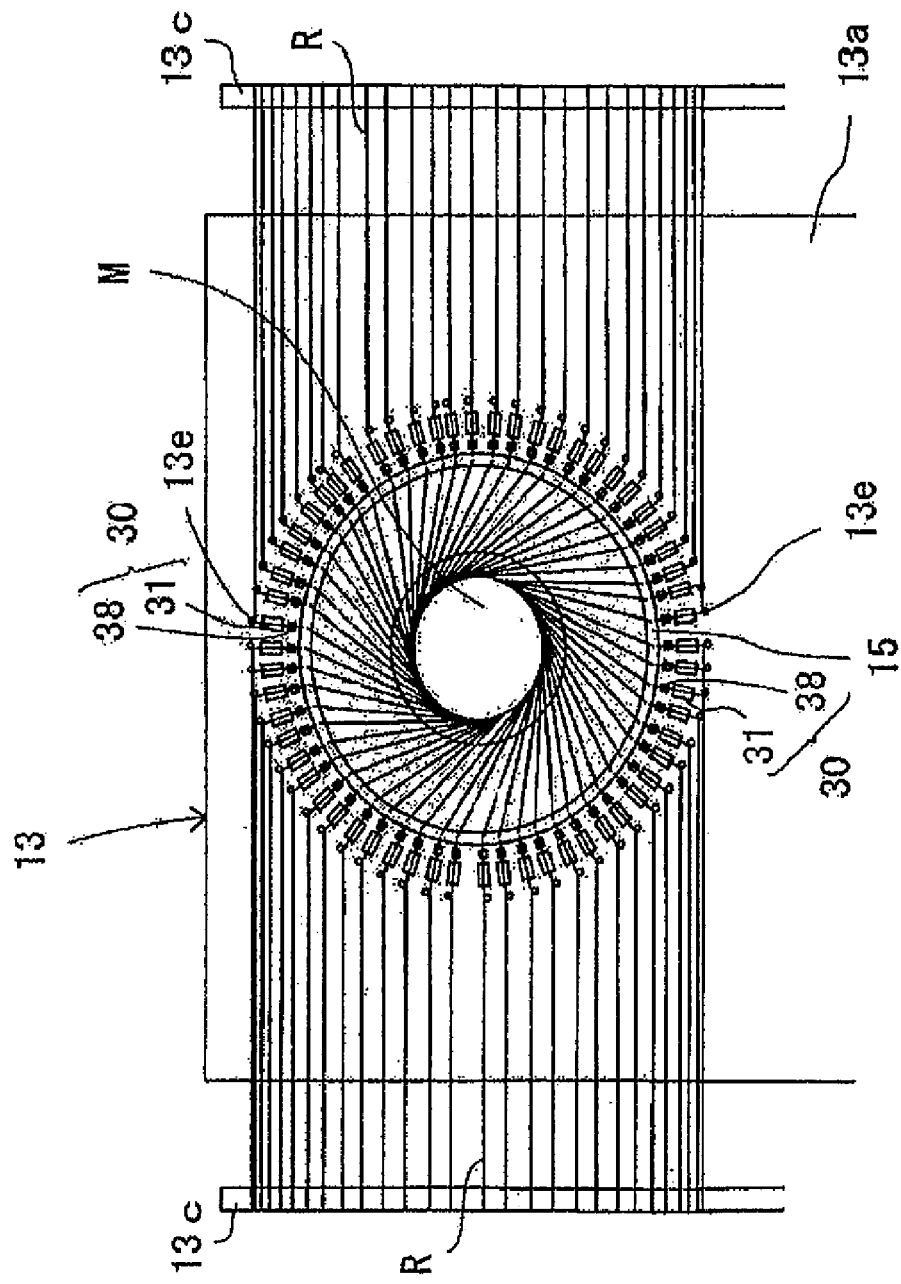

NORMAL STATE

EARLY-STAGE TROUBLE

TROUBLE INCREASED

FIBER BUNDLE BREAKAGE

TENSION CONTROL SYSTEM FOR FIBER BUNDLES IN FILAMENT WINDING APPARATUS

CROSS-REFERENCE TO RELATED APPLICATIONS

This application claims the benefit of priority under 35 USC 119 of Japanese patent application no. 2008-161458, filed on Jun. 20, 2008, and Japanese application no. 2009-034071, filed on Feb. 17, 2009, which are incorporated herein by reference.

BACKGROUND OF THE INVENTION

1. Field of the Invention

The present invention relates to a filament winding apparatus that manufactures products such as hollow containers or the like by winding fiber bundles unwound from fiber bundle feeding packages around a mandrel and, in particular, to a tension control system that controls a tension of the fiber bundles, predicts fiber bundle breakage, and prevents the generation of defective products.

2. Description of the Related Art

As is commonly known, a filament winding apparatus manufactures products including hollow containers such as pressure containers and pipes, for example, by winding fiber bundles R around a mandrel (liner). In the present invention, the fiber bundle R is made by twisting a plurality of single fibers f into one filament yarn as illustrated in FIG. 11A. In the filament winding apparatus, a prescribed winding tension is applied to the fiber bundles R unwound from fiber bundle feeding packages, and the fiber bundles R run in a tension-applied state and then are wound around a mandrel M.

A conventional filament winding apparatus as described in JP 2007-260974A, for example, includes a configuration in which a tension of fiber bundles F is controlled.

As illustrated in FIG. 2 of JP2007-260974A, in a conventional filament winding apparatus 11, a plurality of bobbins B having the fiber bundles F wound around are supported by a spindle 12b connected with a creel stand 12a. By applying a load to rotation of the spindle 12b, the creel stand 12a functions as a tension applying member that applies a winding tension to the fiber bundles F unwound from the bobbins B. The winding tension of the fiber bundles F is measured in a pathway of the fiber bundles F by a tension measuring unit 21 provided on a downstream side of the tension applying member. A control unit 30 controls the load applied to the rotation of the spindle 12b in accordance with the output from the tension measuring unit 21 and thus adjusts the winding tension of the fiber bundles F to a proper value.

In the above conventional filament winding apparatus, the fiber bundles often break in midstream for some reasons. In such a conventional filament winding apparatus, the "fiber bundle breakage" is detected by a configuration such as that described in JP 2003-206071A, for example.

As illustrated in FIG. 1 of JP 2003-206071A, in a conventional filament winding apparatus, an area sensor 4 is provided in a space between a winding unit 1 and a supply unit 10, slightly closer to the winding unit 1. In the apparatus, when a yarn (fiber bundle) F is tensioned in a normal state, the yarn F passes above a detection area of the area sensor 4. To the contrary, when the yarn F breaks for some reasons, the yarn F droops and comes in the detection area of the area sensor 4. Having detected such invasion of the yarn F, the area sensor 4 notifies an operator of the yarn breakage via a speaker or a display, or the like, and stops the filament winding apparatus.

However, the filament winding apparatus described in JP 2003-206071A can only detect complete breakage of the fiber bundle F, and cannot detect a high probability of fiber bundle breakage. Accordingly, in the conventional technique described in JP 2003-206071A, although the filament winding apparatus is stopped when the fiber bundle breakage is detected, the product that is being manufactured at the time of fiber bundle breakage becomes defective and has to be discarded.

SUMMARY OF THE INVENTION

In order to overcome the problems described above, the present invention provides a tension control system for fiber bundles in a filament winding apparatus in which, while a fiber bundle R unwound from a fiber bundle feeding package is supplied to a mandrel winding unit, a tension of the fiber bundle R is monitored, an abnormality (trouble) in the fiber bundle R is determined, fiber bundle breakage is predicted, and the filament winding apparatus is stopped before the fiber bundle breakage, so as to prevent the generation of defective products.

The inventors of the present invention first focused on the fact that the "fiber bundle breakage" often occurs due to a failure in a process of unwinding the fiber bundles from fiber bundle feeding packages. The fiber bundle breakage due to the unwinding failure occurs as described below.

As illustrated in FIGS. 11A-11D, the breakage of the fiber bundle R occurs when one or more of a plurality of single fibers f of the fiber bundle R is snarled or tangled at the time of unwinding process, and thus when an excessive tension is applied. Having been applied with the excessive tension, the single fiber(s) f breaks and remains in the fiber bundle feeding package, and the process of unwinding other fibers is prevented. Further, an excessive tension is also applied to the other fibers which have their unwinding process prevented, and the fibers may break again. Thus, the fibers gradually break, and the fiber bundle breakage occurs when all of the fibers break in the end. The "excessive tension" applied to the fibers due to the unwinding failure means a large degree of tension that breaks the "fibers", but is sufficiently lower than the normal tension (for example, 2 kg) that is applied to the "fiber bundle" composed of a plurality of fibers.

In the conventional filament winding apparatus, as described in JP 2007-260974A, the tension of the tension-applied fiber bundles is measured, and the tension to be applied is controlled in accordance with a measured result. Therefore, even when the excessive tension is applied to some of the "fibers" at the time of unwinding process, the tension of the "fiber bundles" is only adjusted to be a normal tension. Accordingly, in the conventional filament winding apparatus, the normal tension is maintained until the fiber bundle completely breaks, and the breakage is detected only when the fiber bundle is completely broken.

In view of the above problems, and after much consideration, the inventors arrived at the present invention to detect the unwinding failure, i.e., the fiber bundle breakage in advance by providing a tension applying portion on a downstream side of a fiber bundle feeding package and by detecting the tension of the fiber bundle that runs between the tension applying portion and the fiber bundle feeding package.

The present invention provides a tension control system for fiber bundles in a filament winding apparatus. More specifically, in a filament winding apparatus FW that applies a prescribed winding tension to a fiber bundle R unwound from a fiber bundle feeding package and then winds the tension-applied fiber bundle R around a mandrel M, the filament winding apparatus includes a tension applying portion that applies a winding tension to the fiber bundle R at a position that is immediately before a side of the mandrel between the fiber bundle feeding package and the mandrel; a tension sensor that detects a tension of the fiber bundle R between the fiber bundle feeding package and the tension applying portion; and a determination unit that determines a tension abnormality of the fiber bundle by comparing a tension measured value measured by the tension sensor with pre-set reference information. The tension control system for the fiber bundles R controls the tension of the fiber bundle by using the tension sensor between the fiber bundle feeding package and the tension applying portion.

According to one embodiment of the present invention, in the tension control system, the determination unit includes a pre-set tension threshold value and determines a tension abnormality when the tension measured value measured by the tension sensor exceeds the tension threshold value.

According to another embodiment of the present invention, the tension control system includes an alerting unit that issues an alert when the determination unit determines the tension abnormality.

According to another embodiment of the present invention, the tension control system includes a control unit that stops a process of winding the fiber bundle around the mandrel when the determination unit determines the tension abnormality.

According to another embodiment of the present invention, the tension control system includes a display unit for the determination unit to monitor the tension measured value acquired by measuring the tension of each fiber bundle with respect to each fiber bundle feeding package by the tension sensor.

According to another embodiment of the present invention, in the tension control system, the determination unit compares the tension measured value of the fiber bundle of each of the fiber bundle feeding packages with each other on the display unit, and thus determines the tension abnormality with respect to each of the fiber bundle feeding packages.

According to another embodiment of the present invention, in the tension control system, the determination unit compares the tension fluctuations of the fiber bundle of each of the fiber bundle feeding packages with each other on the display unit, and thus determines the tension abnormality with respect to each of the fiber bundle feeding packages.

According to another embodiment of the present invention, in the tension control system, the determination unit includes a storage unit that stores a sampling average value of the fiber bundle measured in the past, and determines the tension abnormality by comparing on the display unit the sampling average value with the tension measured value measured by the tension sensor.

According to another embodiment of the present invention, in the tension control system, the determination unit displays, for monitoring, the tension measured value of the fiber bundle as waveform information representing an amount of temporal fluctuations on the display unit and thus determines the tension abnormality.

The filament winding apparatus configured as described above includes the tension sensor with respect to each of the fiber bundles running from the fiber bundle feeding package to the tension applying portion. Since the winding tension is applied to the fiber bundle that has passed through the tension applying portion, only minimal tension that is sufficiently lower than the winding tension is applied to the fiber bundle running from the fiber bundle feeding package to the tension applying portion. Therefore, the tension sensor provided between the fiber bundle feeding package and the tension applying portion can easily detect the tension that has been increased due to unwinding failures, or the like. As a result, the breakage of the fiber bundles can be predicted, and thus the generation of defective products can be prevented.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 5 is a schematic elevation view of an example of a helical winding head of the filament winding apparatus of FIGS. 1 and 2.

DETAILED DESCRIPTION OF EMBODIMENTS OF THE INVENTION

Embodiments of the present invention will now be described with reference to the drawings.

[Configuration]

Figure 1:
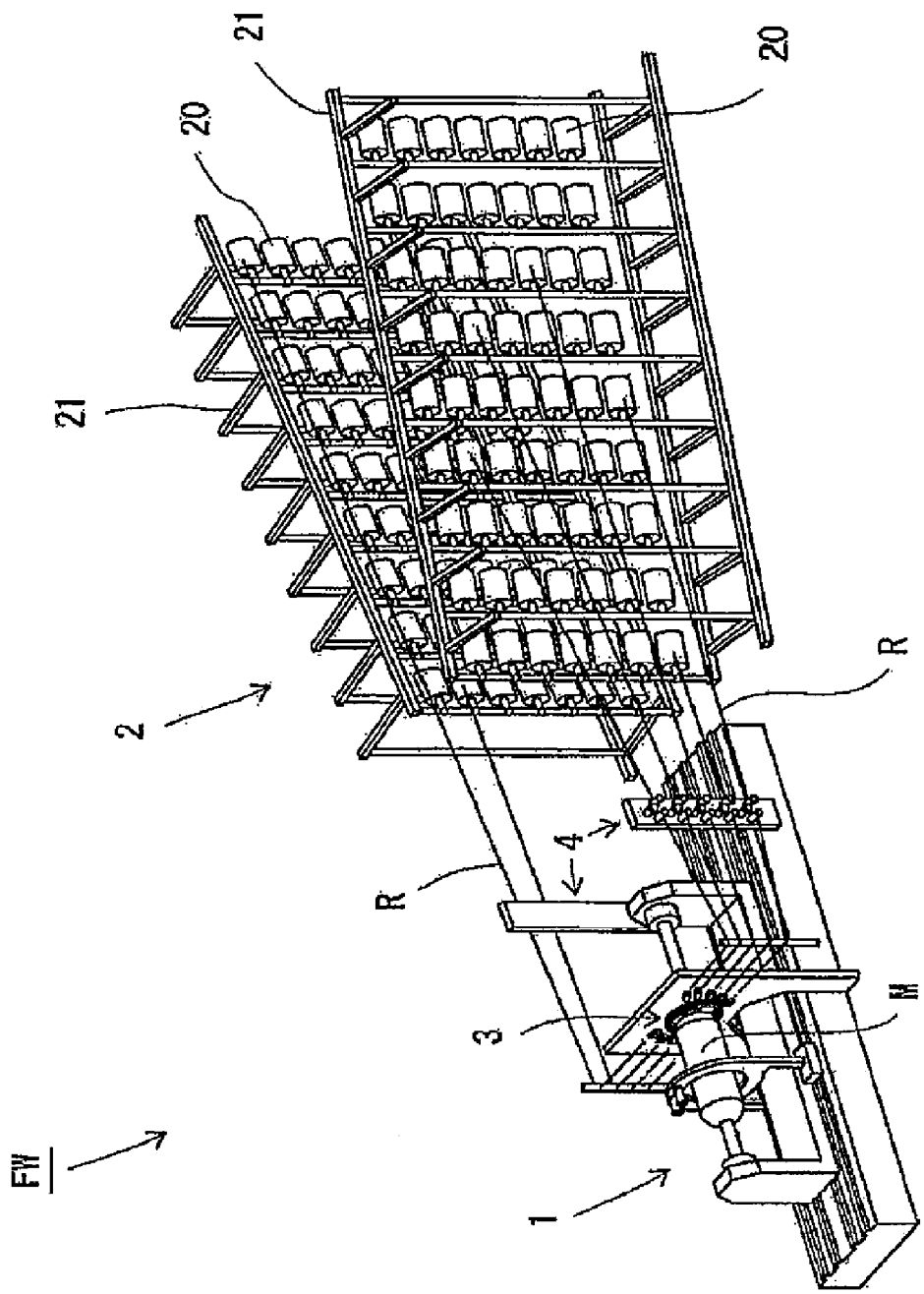
FIG. 1 is a schematic perspective view of a filament winding apparatus according to an embodiment of the present invention.
Figure 2:
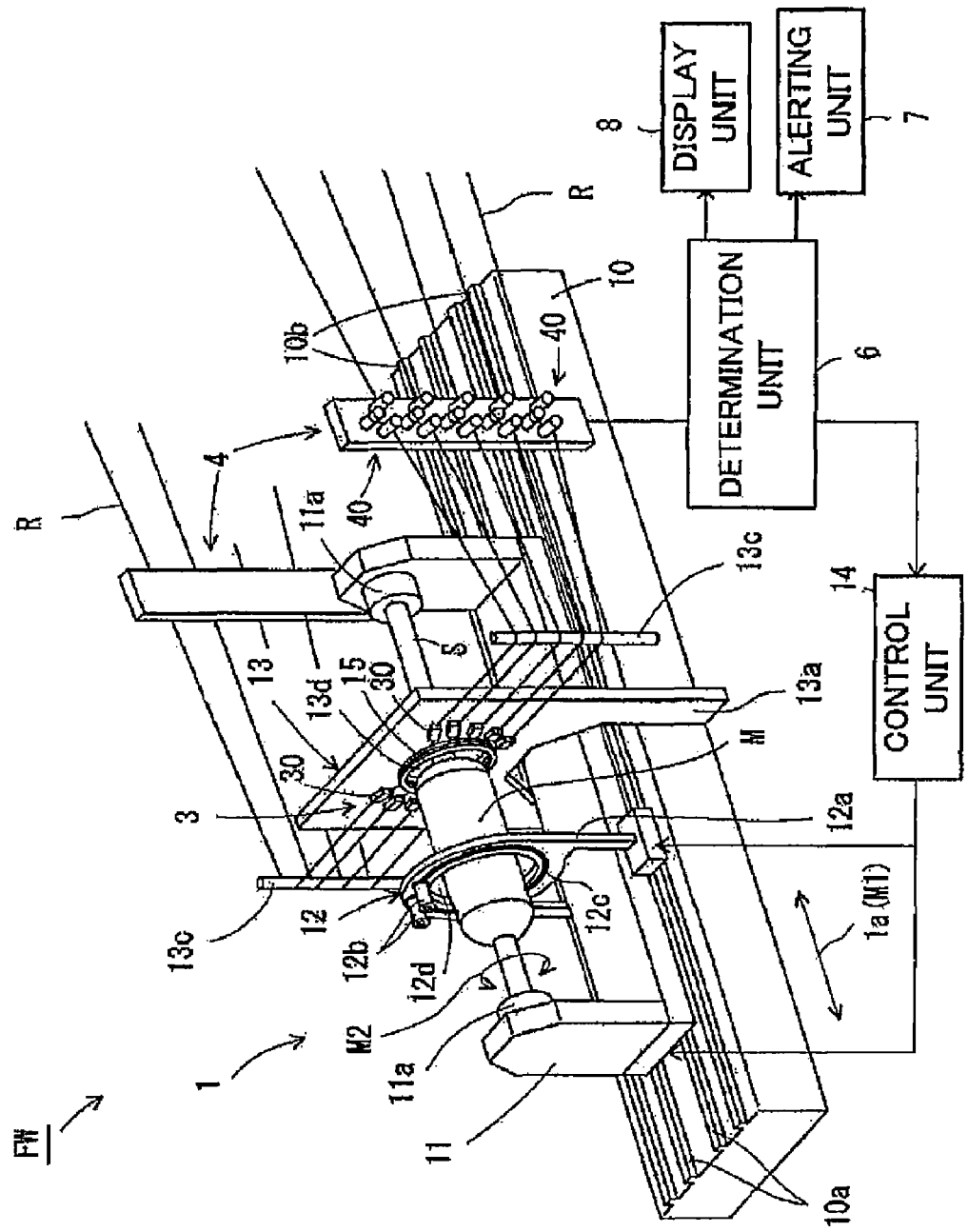
FIG. 2 is a schematic perspective view illustrating a winding unit in detail and its control in a filament winding apparatus according to an embodiment of the present invention.

A configuration of a filament winding apparatus FW will be described according to an embodiment of the present invention. As illustrated in FIGS. 1 and 2, the filament winding apparatus FW primarily includes a winding unit 1, a fiber bundle feeding unit 2, a tension applying unit 3, and a tension detecting unit 4.

The winding unit 1 winds fiber bundles R around a mandrel M. The fiber bundle feeding unit 2 includes a plurality of fiber bundle feeding packages 20 with respect to creel stands 21. The fiber bundle R is wound around each of the fiber bundle feeding packages 20. The tension detecting unit 4 detects a tension of each of the fiber bundles R fed from the fiber bundle feeding unit 2. The tension applying unit 3 applies a tension to the running fiber bundle R.

The fiber bundle R is composed of textile materials such as glass fiber and textile materials using synthetic resin, for example. The fiber bundle feeding unit 2 supplies the winding unit 1 with the fiber bundles R unwound from each of the fiber bundle feeding packages 20.

The fiber bundle R is impregnated in advance with thermosetting synthetic resin. The fiber bundle R may not be impregnated with resin. In such a case, a resin impregnating device may be provided between the winding unit 1 and the fiber bundle feeding unit 2 to impregnate the fiber bundles R fed from the fiber bundle feeding packages 20 with resin and then supply the winding unit 1 with the resin-impregnated fiber bundles R.

Figure 3:
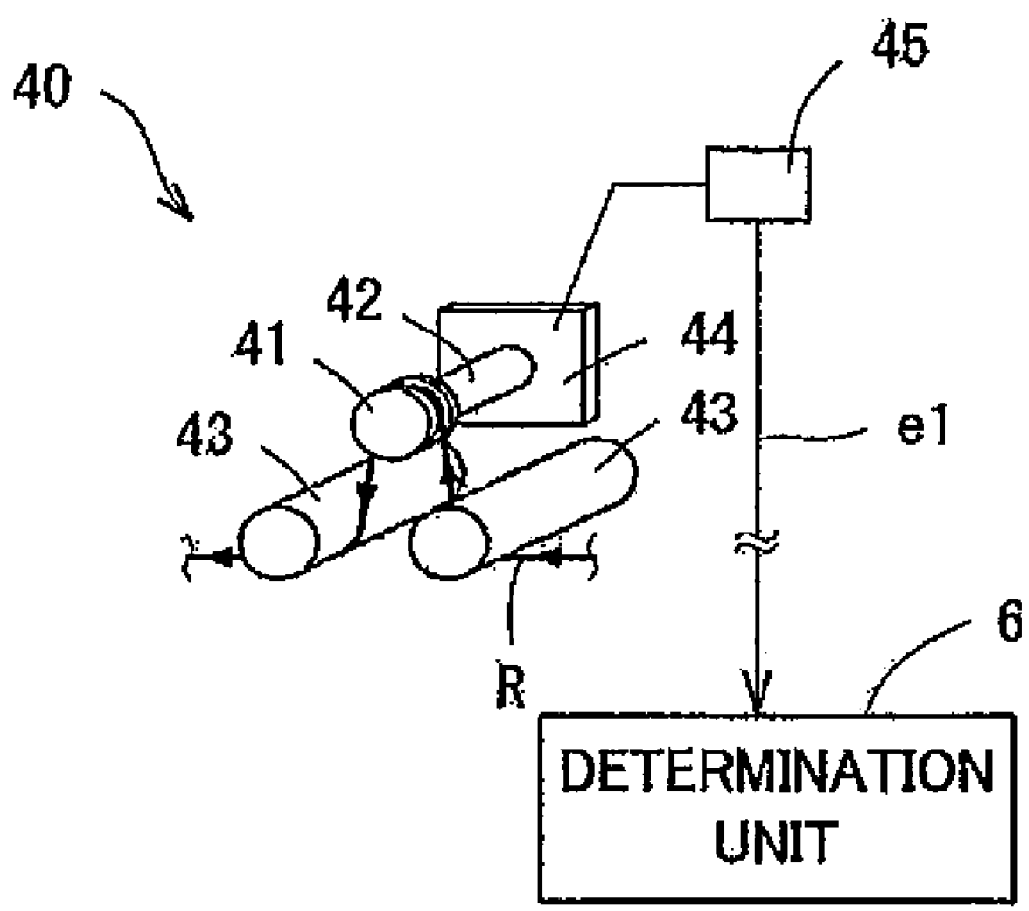
FIG. 3 is a schematic perspective view of a configuration of a tension sensor according to an embodiment of the present invention.

As illustrated in FIG. 2, the tension detecting unit 4 includes tension sensors 40, a determination unit 6, an alerting unit 7, and a display unit 8. The tension sensor 40 is provided with respect to each fiber bundle R. As illustrated in FIG. 3, the tension sensor 40 includes a guide wheel 41 and guide rollers 43 that guide the fiber bundle R.

The guide wheel 41 is coaxially attached to a leading edge of a supporting rod 42. The guide wheel 41 and the guide rollers 43 can freely rotate. The supporting rod 42 and the guide rollers 43 extend horizontally along a direction that is perpendicular to a running direction of the fiber bundle R. The guide wheel 41 and the supporting rod 42 are located above the guide rollers 43 aligned with space therebetween. The fiber bundle R is guided by the guide wheel 41 and the guide rollers 43 while being flexed.

An elastic plate 44 is attached to a rear edge of the supporting rod 42. The elastic plate 44 is positioned perpendicular to an axial direction of the supporting rod 42. A strain gauge 45 is attached to the elastic plate 44. The strain gauge 45 detects its strain and outputs a detection signal e1.

While the fiber bundle R is being guided, a depressing force acts on the guide wheel 41 in accordance with the tension of the fiber bundle R. The depressing force generates elastic strain on the elastic plate 44 via the supporting rod 42. The strain gauge 45 detects the tension of the fiber bundle R by detecting the elastic strain of the elastic plate 44 and outputs the detection signal e1. The detection signal e1 is transmitted to the determination unit 6.

The determination unit 6 determines whether or not the fiber bundles R are being normally (properly) unwound (i.e. whether or not the fiber bundles R are likely to break) in accordance with the tension of the fiber bundle R detected by the tension detecting unit 4. The determination unit 6 stores a tension reference value (threshold value) in advance in one example. The tension reference value represents, for example, the tension of the fiber bundle R of the time when the fiber bundle R is being normally unwound from the fiber bundle feeding package 20. The fiber bundle R running from the fiber bundle feeding package 20 to the tension detecting unit 4 is applied with tension to a degree (for example, a tension of 100 g) to prevent the unwound fiber bundle R from drooping.

The determination unit 6 compares a tension reference value ea with a tension value (detection signal e1) of the fiber bundle R detected by the tension detecting unit 4. When the detected tension value (detection signal e1) is higher than the tension reference value e0, the determination unit 6 determines that an excessive tension is being applied to the fiber bundle R and that the fiber bundle R is likely to break. At this time, the determination unit 6 transmits a stop signal e2 to a control unit 14 and a stop signal e6 to the winding unit 1 via the control unit 14 to stop the winding process performed by the winding unit 1 on the fiber bundles R. Simultaneously, the determination unit 6 transmits an alert signal e3 to the alerting unit 7. Having received the alert signal e3, the alerting unit 7 generates an alert tone, for example, to notify the operator that the fiber bundle R is likely to break.

As illustrated in FIG. 2, the winding unit 1 includes a machine frame 10. The machine frame 10 includes a pair of parallel first guide rails 10a that extend in a longitudinal direction 1a. The winding unit 1 further includes a mandrel supporting frame 11. The mandrel supporting frame 11 can reciprocate in the longitudinal direction 1a along the first guide rails 10a.

The mandrel supporting frame 11 includes a spindle S that extends in the longitudinal direction 1a. The mandrel supporting frame 11 rotationally supports the spindle S by spindle rotational axes 11a provided on both sides of the mandrel supporting frame 11. The spindle rotational axes 11a rotate the spindle S around a central axis.

Figure 4A:
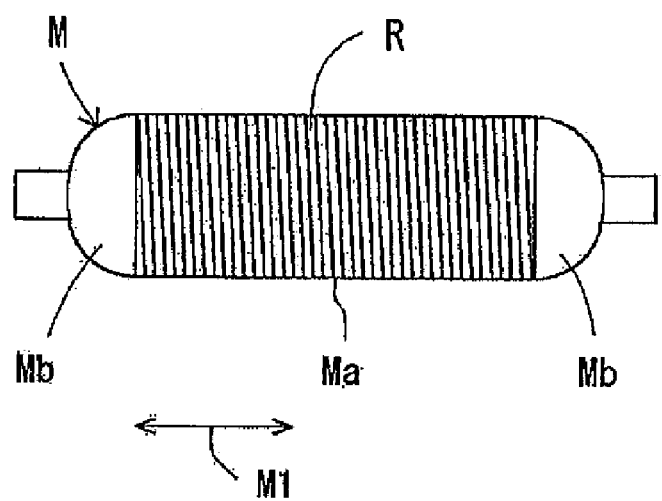
FIGS. 4A-4C are schematic side views illustrating examples of hoop-winding and helical-winding according to an embodiment of the present invention.
Figure 4B:
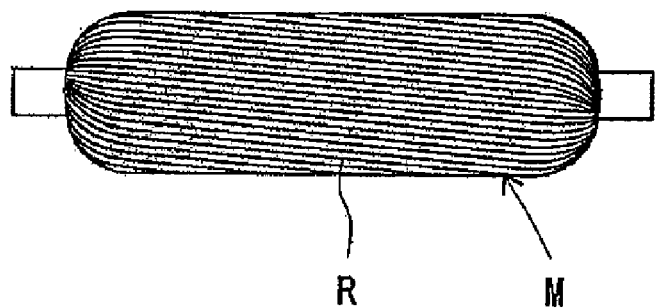
Figure 4C:
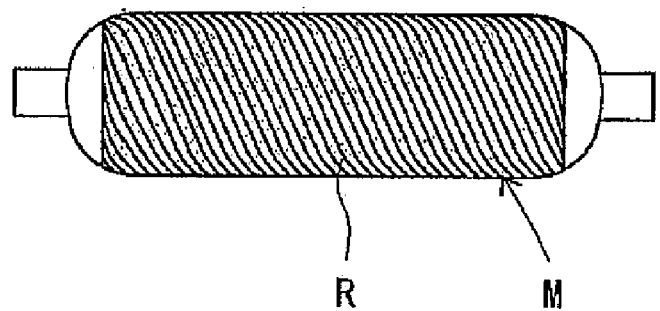

When producing a pressure container, the mandrel M may be made of high-strength aluminum, metal, or resin, for example, and has a cylindrical portion Ma and dome portions Mb provided on both sides of the cylindrical portion Ma (FIGS. 4A-4C). The spindle S removably fixes the mandrel M. The mandrel M is fixed to the spindle S along the central axis. Accordingly, the longitudinal direction 1a of the machine frame 10 corresponds to a mandrel axial direction M. The material and the shape of the mandrel M may be changed in accordance with a product to be produced.

The winding unit 1 includes a hoop winding head 12 and a helical winding head 13. The hoop winding head 12 hoop-winds the fiber bundle R around the mandrel M (FIG. 4A). The helical winding head 13 helical-winds the fiber bundle R around the mandrel M (FIGS. 4D and 4C).

FIGS. 4A-4C are side views illustrating hoop-winding and helical-winding. As illustrated in FIG. 4A, hoop-winding winds the fiber bundle R at a substantially right angle with respect to the mandrel axial direction M1 of the mandrel M. As illustrated in FIGS. 4B and 4C, helical-winding winds the fiber bundle R at a predetermined angle with respect to the mandrel axial direction M1 of the mandrel M.

As illustrated in FIG. 2, the winding unit 1 includes the control unit 14. The control unit 14 controls the start, the stop, and the speed of the reciprocating movement of the mandrel supporting frame 11 and the start, the stop, and the number of rotations of the mandrel M rotated by the spindle rotation axes 11a. The control unit 14 also controls the start, the stop, and the speed of the reciprocating movement of the hoop winding head 12, the start, the stop, and the speed of circulation of bobbins 12b, and further the tension applied to the fiber bundle R by a tension applying portion 30 through a signal e5.

As illustrated in FIG. 2, the hoop winding head 12 includes a hoop winding head body frame 12a. The hoop winding head body frame 12a includes a penetration portion 12d that is opened at its center. The hoop winding head 12 has the mandrel M penetrated through the penetration portion 12d.

The machine frame 10 includes a pair of parallel second guide rails 10b that extend in the longitudinal direction 1a. The hoop winding head body frame 12a can reciprocate in the longitudinal direction 1a along the second guide rails 10b. Thus, the hoop winding head 12 can reciprocate in the longitudinal direction 1a of the machine frame 10 with the mandrel M penetrated through the penetration portion 12d.

The hoop winding head 12 includes a plurality of bobbins 12b (two bobbins 12b in the present embodiment) each having the fiber bundle R wound around. The hoop winding head body frame 12a includes a guide trough 12c along a circumferential direction M2 of the mandrel M around the penetration portion 12d. The bobbins 12b circulate along the guide trough 12c. The fiber bundles R fed from the circulating bobbins 12b are wound around the mandrel M.

The helical winding head 13 includes a helical winding head body frame 13a. The helical winding head body frame 13a includes a penetration portion 13d that is opened at its center. The helical winding head 13 can have the mandrel M penetrated through the penetration portion 13d.

The helical winding head body frame 13a is fixed to the machine frame 10. The helical winding head 13 can relatively reciprocate in the longitudinal direction 1a with the mandrel M penetrated through the penetration portion 13d when the mandrel supporting frame 11 reciprocates.

As illustrated in FIG. 5, the helical winding head 13 winds the fiber bundles R fed from the fiber bundle feeding packages 20 of the fiber bundle feeding unit 2 (FIG. 1) around the mandrel M. The helical winding head body frame 13a includes a ring-like guide ring portion (an immediate guide member) 15 that extends along the circumferential direction M2 (FIG. 2) of the mandrel M around the penetration portion 13d. The helical winding head 13 includes a plurality of ring-like auxiliary guides 13e around the guide ring portion 15. The helical winding head 13 also includes guide rollers 13c on both sides of the helical winding head body frame 13a. The helical winding head body frame 13a further includes the tension applying portions 30 between the guide ring portion 15 and the auxiliary guides 13e.

The helical winding head 13 guides, by the guide rollers 13c, the fiber bundles R fed from the fiber bundle feeding packages 20 (FIG. 1) and introduces the guided fiber bundles R to the auxiliary guides 13e. The fiber bundles R are supplied to the tension applying portions 30 via the auxiliary guides 13e. The fiber bundles R are then guided by the guide ring portion 15 to the mandrel M.

Figure 6A:
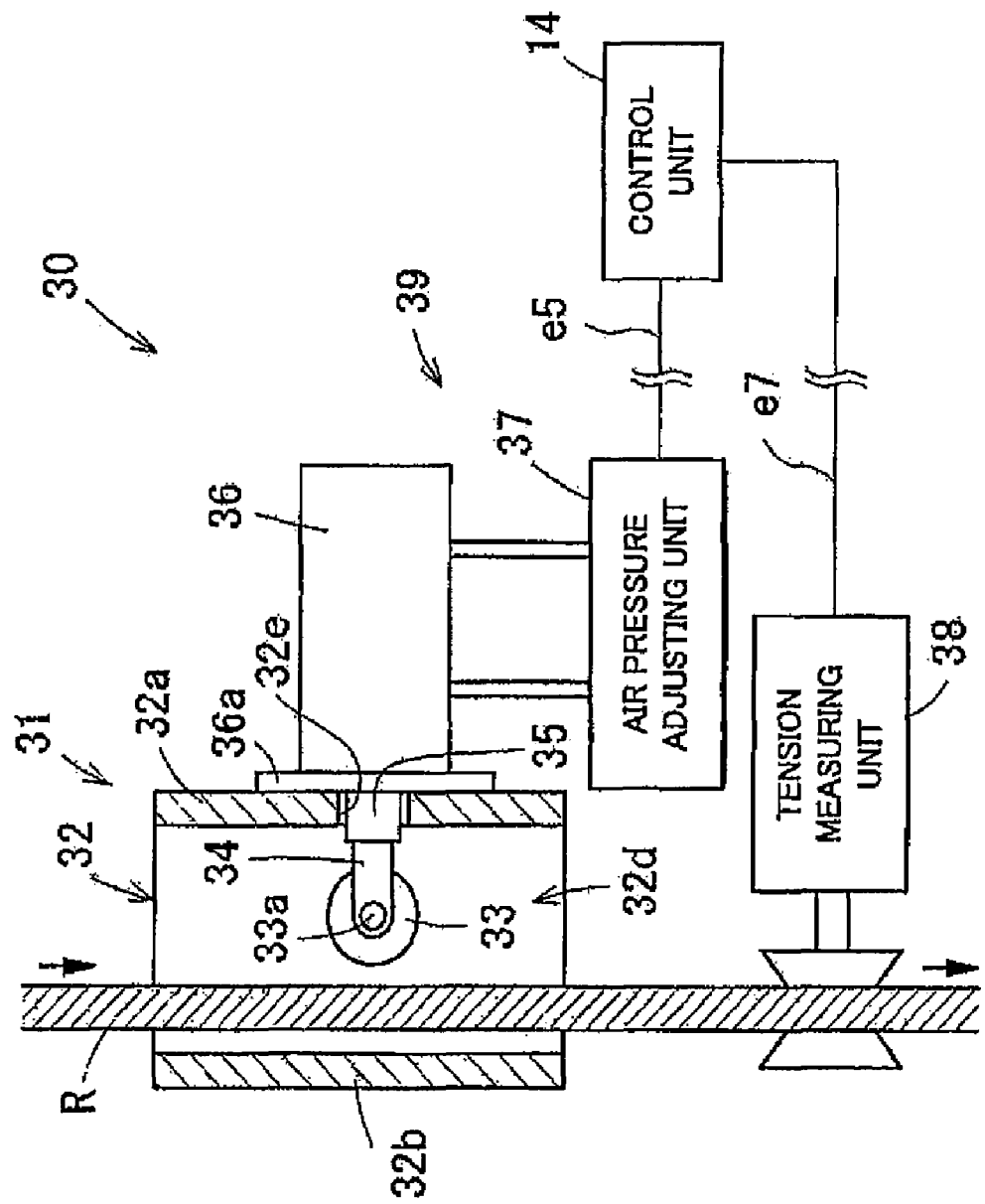
FIGS. 6A and 6B are schematic partially sectional views of an example of a tension applying portion according to an embodiment of the present invention.
Figure 6B:
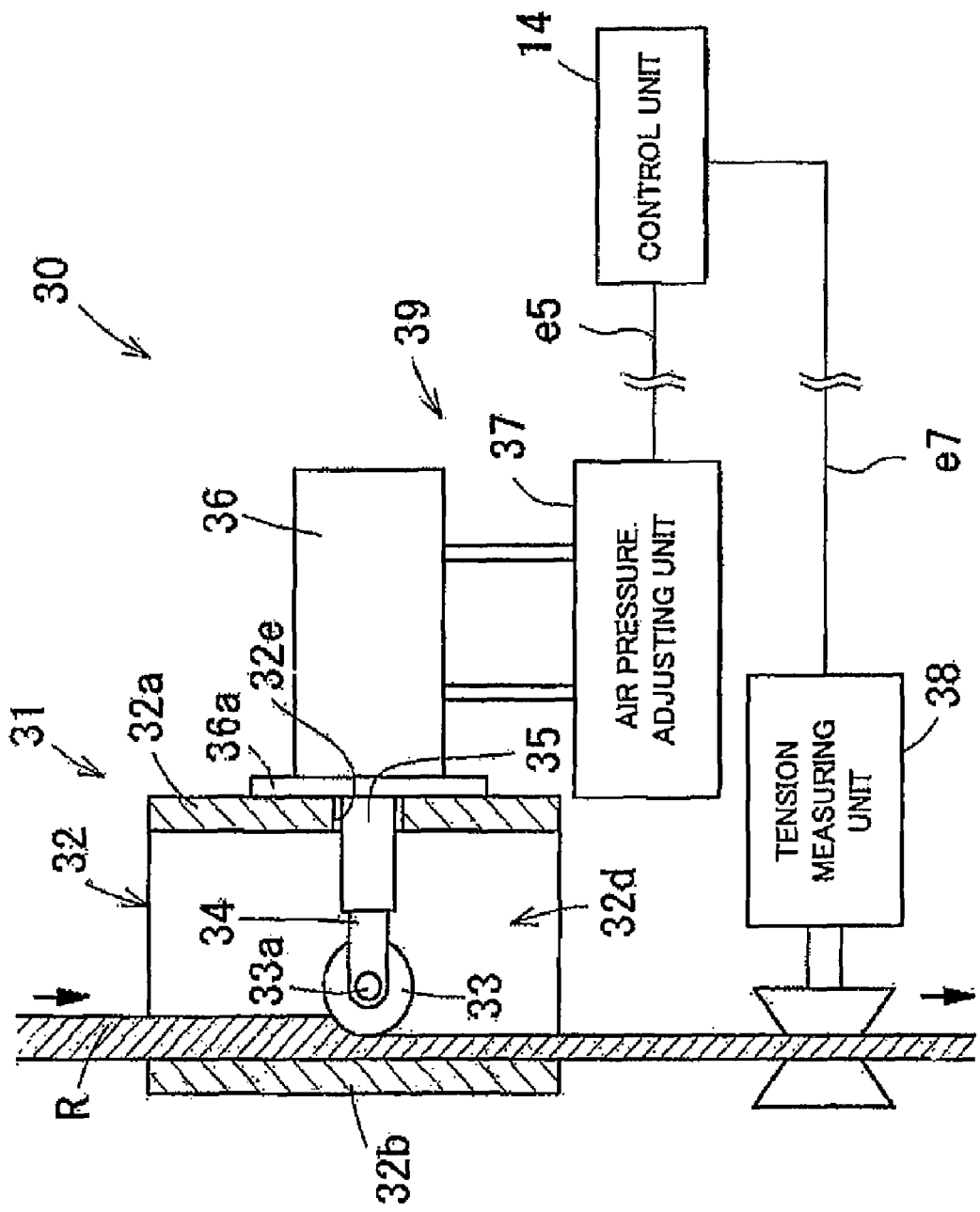

As illustrated in FIG. 5, the tension applying portion 30 includes a tension applying mechanism 31 and a tension measuring unit 38. As illustrated in FIGS. 6A and 6B, the tension applying mechanism 31 includes a frame 32 and a press roller 33 arranged in an inner side space 32d of the frame 32. The tension applying mechanism 31 includes a supporting member 34 that supports the press roller 33 such that the roller 33 can freely rotate around its axis and an air cylinder 36 that has a to-and-fro rod 35 connected with the supporting member 34. The tension applying portion 30 further includes a tension applying operation mechanism 39. The tension applying operation mechanism 39 includes an air pressure adjusting member 37 that adjusts air pressure to be supplied to the air cylinder 36 and the tension measuring unit 38 arranged on an exit side (downstream side) of the frame 32.

The frame 32 has a U-shaped cross section that is open on a front side (on the front sides of FIGS. 6A and 6B). The frame 32 includes a side wall 32a and a side wall 32b (a first nipping member). The inner side space 32d is provided between the side walls 32a and 32b of the frame 32. The fiber bundle R that runs towards the mandrel M (i.e. that runs downward in FIGS. 6A and 6B) is arranged on a side of the side wall 32b in the inner side space 32d. The press roller 33 (a second nipping member) is arranged on a side of the side wall 32a in the inner side space 32d.

The press roller 33 includes an axis 33a that extends horizontally (in a direction that is perpendicular to the plane of paper of FIGS. 6A and 6B). The press roller 33 is supported by the supporting member 34 via the axis 33a such that the roller 33 can freely rotate. The supporting member 34 is connected to a leading edge of the to-and-fro rod 35 of the air cylinder 36.

The air cylinder 36 is attached to an external surface of the side wall 32a of the frame 32 via a flange 36a. The to-and-fro rod 35 of the air cylinder 36 passes through a hole 32e of the side wall 32a of the frame 32 and extends towards the inside of the inner side space 32d. The to-and-fro rod 35 can move back and forth towards the side wall 32b of the frame 32 along with the press roller 33 that is attached to the leading edge of the rod 35 via the supporting member 34. The to-and-fro rod 35 can be driven by the air pressure adjusting member 37 that is provided to the air cylinder 36.

The air pressure adjusting member 37 is connected with the control unit 14 of the winding unit 1 (FIGS. 1 and 2) to transmit (exchange) signals therebetween. The air pressure adjusting member 37 adjusts the air pressure to be supplied to the air cylinder 36 in accordance with the air pressure control signal e5 sent from the control unit 14. In accordance with the supplied air pressure, the air cylinder 36 moves the to-and-fro rod 35 backward and forward. As illustrated in FIG. 6B, when the to-and-fro rod 35 is moved forward by the air pressure adjusting member 37, the fiber bundle R is nipped between the press roller 33 and the side wall 32b and pressed. The pressed fiber bundle R is opened (i.e., spread wide), and the winding tension is applied in accordance with a pressing force.

The tension measuring unit 38 includes a contact tension measuring unit having a strain gauge, for example, and is connected with the control unit 14 of the winding unit 1 so as to transmit (exchange) signals. The tension measuring unit 38 makes contact with the fiber bundle R applied with the winding tension, and measures the tension. The tension measuring unit 38 generates a measured signal e7 in accordance with the measured tension and transmits the signal e7 to the control unit 14. The control unit 14 generates an air pressure control signal in accordance with the measured signal e7 sent from the tension measuring unit 38. The control unit 14 drives the air cylinder 36 in accordance with the air pressure control signal e5, and thus controls the pressing force of the press roller 33, that is, the winding tension to be applied to the fiber bundle R.

[Operation]

Next, a hoop-winding operation by the filament winding apparatus FW will be described. As illustrated in FIG. 7, when performing hoop-winding, the control unit 14 operates the hoop winding head 12 as follows.

Figure 7A:
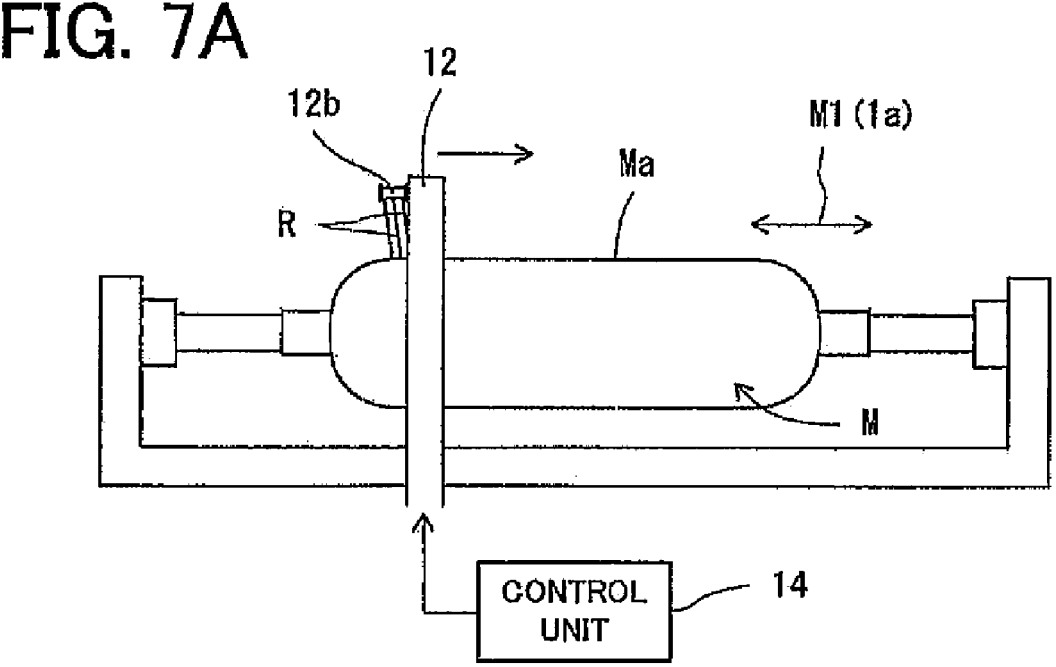
FIGS. 7A and 7B are schematic side views illustrating a hoop-winding operation of the filament winding apparatus according to an embodiment of the present invention.
Figure 7B:
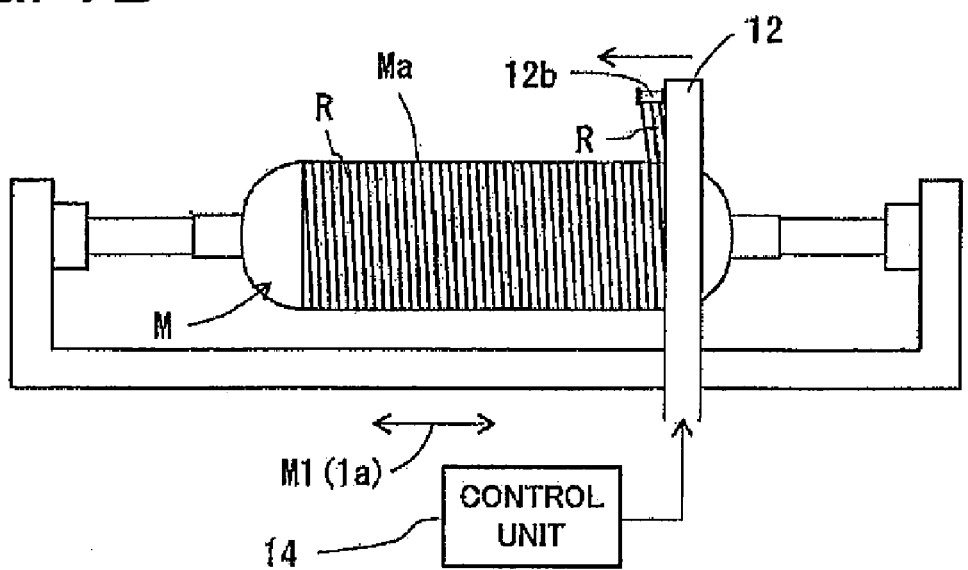

The hoop winding head 12 is arranged on one end (on the left side of the drawing) of the cylindrical portion Ma of the mandrel M (FIG. 7A). Leading edges of the fiber bundles R fed from the two bobbins 12b are fixed to the end of the cylindrical portion Ma of the mandrel M by tape or the like. At this timer each of the leading edges of the fiber bundles R is closely aligned in parallel with the axial direction M1 of the mandrel M.

While the hoop winding head 12 is moved towards the other end (on the right side of the drawing) of the mandrel M, the bobbins 12b are circulated. Thus, the fiber bundles R are fed from the bobbins 12b. The two fiber bundles R are closely arranged in parallel with one another at a substantially right angle (slightly slanted) with respect to the axial direction M1 of the mandrel M in such a manner that the fiber bundles R do not overlap with one another. The movement speed of the hoop winding head 12 and the circulation speed of the bobbins 12b are set (determined) to achieve the above arrangement.

The hoop winding head 12 is moved from one end (from the left in FIG. 7A) to the other end (to the right in FIG. 7B) of the cylindrical portion Ma of the mandrel M. Thus, a layer of the fiber bundles R is wound around the cylindrical portion Ma of the mandrel M. Then, the hoop winding head 12 is moved from the other end (from the right in FIG. 7B) to the end (to the left in FIG. 7A) of the cylindrical portion Ma of the mandrel M.

When the hoop winding head 12 reciprocates one time, two layers of the fiber bundles R are wound around the cylindrical portion Ma of the mandrel M. When winding the fiber bundles R further, the above operation is repeated a prescribed number of times. Then, by cutting each of the fiber bundles R by a cutter or the like, hoop-winding is completed.

Figure 8A:
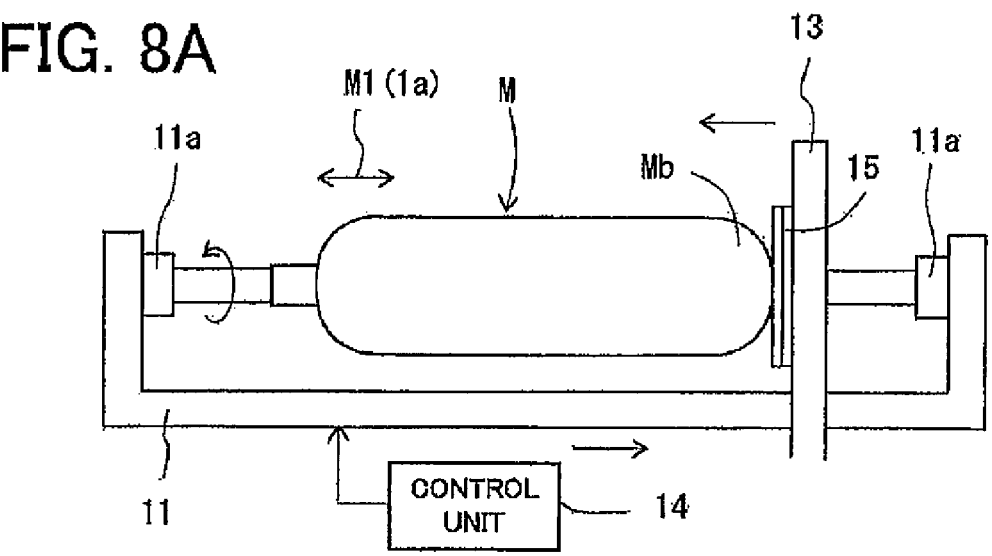
FIGS. 8A and 8B are schematic side views illustrating a helical-winding operation of the filament winding apparatus according to an embodiment of the present invention.
Figure 8B:
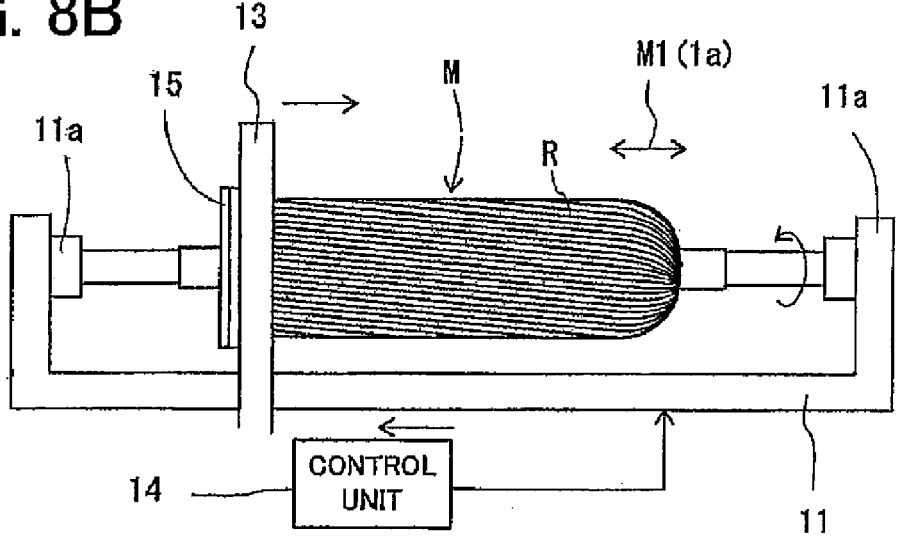

Next, a helical-winding operation by the filament winding apparatus FW will be described. As illustrated in FIG. 8, when performing helical-winding, the control unit 14 operates the mandrel supporting frame 11 as follows.

First, the helical winding head 13 is arranged on one end (i.e., an edge of the dome portion Mb on the right in FIG. 8A) of the mandrel M.

Then, each of the fiber bundles R fed from the guide ring portion 15 is fixed to the end of the mandrel M by tape or the like. Then, the mandrel supporting frame 11 is moved to relatively move the helical winding head 13 from the end (from the right in FIG. 8A) to another end (to the left in FIG. 8B) of the mandrel M. Along with the above movement, the mandrel M is rotated by the spindle rotational axes 11a.

Each of the fiber bundles R are closely wound in parallel to one another at a prescribed winding angle with respect to the axial direction M1 of the mandrel M such that the fiber bundles R do not overlap with one another. The movement speed of the helical winding head 13 (mandrel supporting frame 11) and the rotation speed of the mandrel M (spindle rotational axes 11a) are set (determined) to achieve the above arrangement.

Then, the helical winding head 13 is moved from the other end (from the left in FIG. 8B) to the end (to the right in FIG. 8A) of the mandrel M. When the helical winding head 13 reciprocates one time, two layers of the fiber bundles R are wound around the mandrel M. When winding the fiber bundles R further, the above operation is repeated a prescribed number of times.

Then, by cutting each of the fiber bundles R by a cutter or the like, helical-winding is completed.

Until helical-winding is completed after each of the fiber bundles R is fixed to the end of the mandrel M by tape or the like, the tension applying portion 30 is operated by the control unit 14 as follows.

The air pressure adjusting member 37 of the tension applying portion 30 is driven in accordance with the air pressure control signal e5 sent from the control unit 14. The air pressure supplied to the air cylinder 36 is adjusted by the air pressure adjusting member 37. Thus, the to-and-fro rod 35 is moved forward to the side wall 32b of the frame 32.

When the to-and-fro rod 35 moves forward to the side wall 32b, the fiber bundle R running towards the mandrel M is nipped and pressed by the press roller 33 attached to the leading edge of the to-and-fro rod 35 and by the side wall 32b of the frame 32. The pressed fiber bundle R is opened (spread wide), and the winding tension based on the pressing force is applied.

The tension measuring unit 38 measures the tension of the fiber bundle R applied with the winding tension and transmits the measured signal e7 to the control unit 14. Having received the measured signal e7, the control unit 14 drives the air pressure adjusting unit 37 in accordance with the measured signal e7. The air pressure is adjusted by the air pressure adjusting unit 37, and the pressing force from the press roller 33 to the fiber bundle R is adjusted. Thus, the winding tension applied to the fiber bundle R is controlled to be a prescribed tension. The fiber bundle R applied with the prescribed tension is properly wound around the mandrel M.

While helical-winding is being performed, the tension sensor 40 detects the tension of the fiber bundle R that has been unwound from the fiber bundle feeding package 20 and running to the tension applying portion 30. The tension sensor 40 outputs a detection signal in accordance with the detected tension of the fiber bundle R and transmits the signal to the determination unit 6. When the tension value detected by the tension sensor 40 is higher than the tension reference value, the determination unit 6 determines that the fiber bundle R is likely to break. Having determined as above, the determination unit 6 transmits a stop signal to the control unit 14. Having received the stop signal, the control unit 14 stops the winding operation performed on the fiber bundle R by the helical winding head 13. The determination unit 6 simultaneously transmits an alert signal to the alerting unit 7. Having received the alert signal, the alerting unit 7 generates an alert tone to notify the operator that the fiber bundle R is likely to break.

Having received the alert, the operator deals with (eliminates) the cause of the unwinding failure and then resumes the winding operation on the fiber bundle R by the helical winding head 13.

Figure 9:
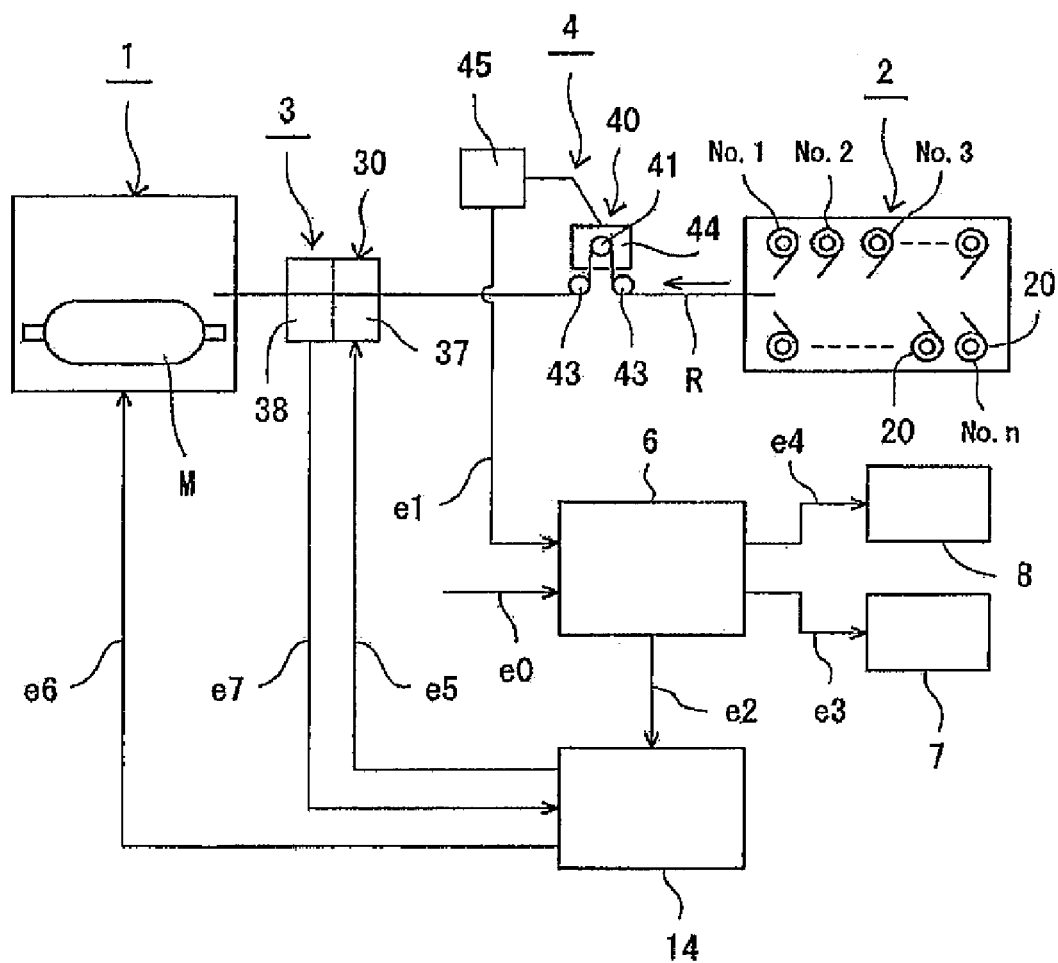
FIG. 9 is a block diagram schematically illustrating a tension control system applied to the filament winding apparatus that controls a tension of a fiber bundle according to an embodiment of the present invention.

Next, a tension control system for the fiber bundles in the present invention will be described in detail with reference to FIGS. 9 and 10.

In the present invention, in accordance with the tension measured value of the fiber bundle R measured by the tension sensor 40, basically, the determination unit 6 compares the tension measured value with the pre-set reference information, controls the tension of the fiber bundles, and determines, before the fiber bundle R breaks, whether or not the state of tension is normal.

An example of a determining method includes a basic configuration in which the pre-set tension threshold value and the tension measured value measured by the tension sensor 40 are compared, and the tension abnormality is determined when the tension measured value exceeds the tension threshold value.

Figure 10A:
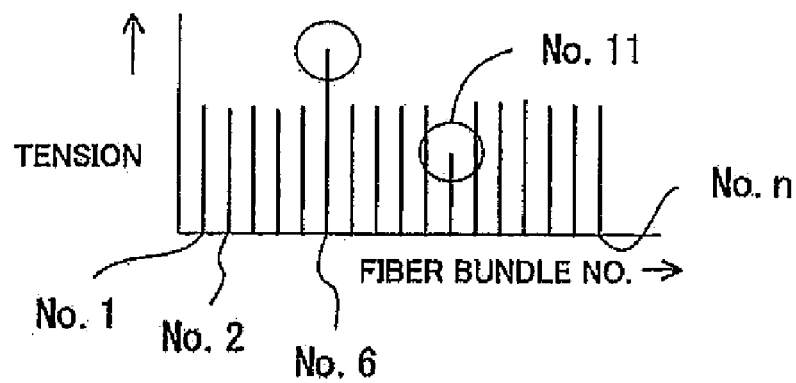
FIGS. 10A-10C are schematic graphs for explaining specific methods of the tension control system.
Figure 10B:
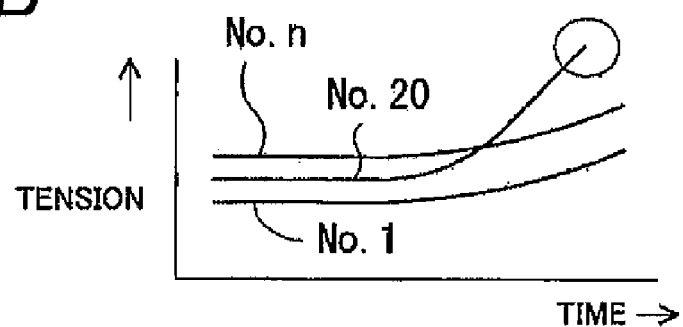
Figure 10C:
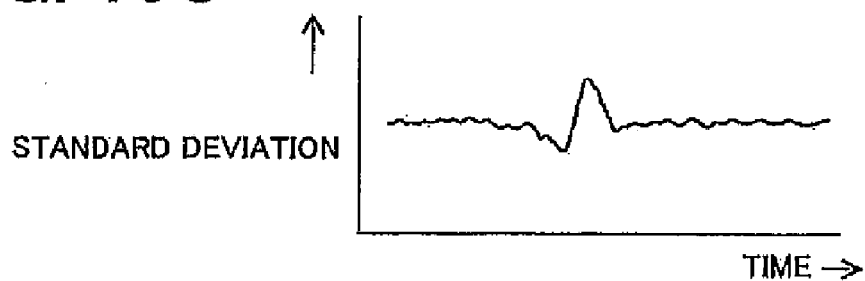
Figure 11A:
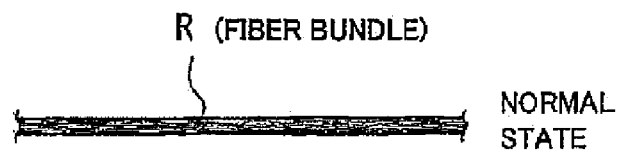
FIGS. 11A-11D are schematic diagrams illustrating processes of fiber bundle breakage regarding a fiber bundle composed of a plurality of single fibers twisted into one filament yarn according to an embodiment of the present invention.
Figure 11B:
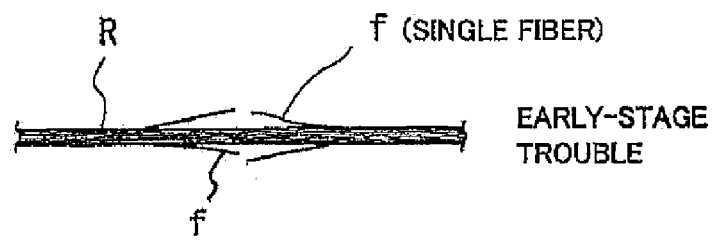
Figure 11C:
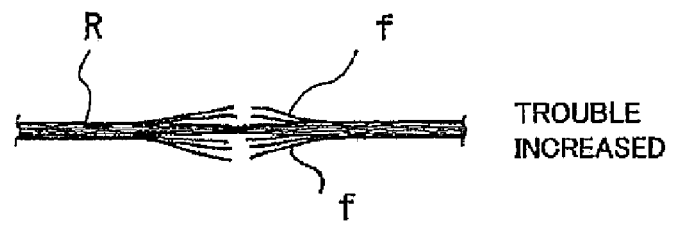
Figure 11D:
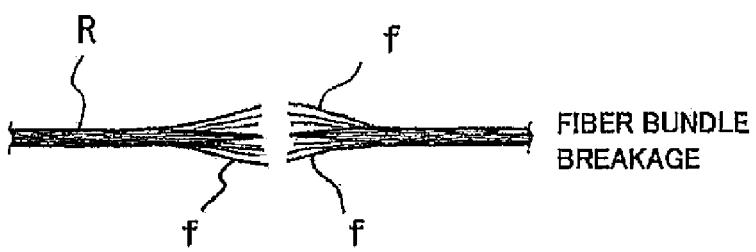

Another example of a determining method of the present invention measures the tension of each fiber bundle with respect to each fiber bundle feeding package, and includes the display unit 8 for monitoring the tension measured value. Further, the determining method includes:

(1) a system in which the tension measured value of the fiber bundle R of each of the fiber bundle feeding packages 20 is compared with each other on the display unit 8, and thus the tension abnormality is determined with respect to each of the fiber bundle feeding packages (the fiber bundle feeding package No. 6 and No. 11 indicate an abnormality in FIG. 10A);

(2) a system in which tension fluctuations of the fiber bundle R of each of the fiber bundle feeding packages are compared with each other on the display unit 8, and thus the tension abnormality is determined with respect to each of the fiber bundle feeding packages (the fiber bundle feeding package No. 20 indicates an abnormality in FIG. 10B);

(3) a system that has a storage unit arranged to store a sampling average value of the fiber bundle that was measured in the past and that compares on the display unit 8 the sampling average value with the tension measured value measured by the tension sensor in order to determine the tension abnormality, the system being advantageous in that the tension can be controlled in view of phenomena specific to the fiber bundle feeding package occurring in a bundle pathway or the like, compared with the system in which the tension is compared with respect to each of the fiber bundle feeding packages; and (4) a system in which the tension measured value of the fiber bundle is monitored and displayed on the display unit 8 as waveform information representing an amount of temporal fluctuations, and the tension abnormality is determined (FIG. 10c). This method (4) is advantageous in that the standard deviation of the tension of the fiber bundle R can be monitored and predicted, the initial trouble such as the breakage of a single fiber f can be monitored, and the abnormality can be reliably determined before the fiber bundle R breaks.

[Functions and Effects]

In the filament winding apparatus FW, the tension applying portion 30 that applies the winding tension to the fiber bundle R is provided in the vicinity of the mandrel M. That is, the winding tension is applied to the fiber bundle R immediately before the fiber bundle R is wound around the mandrel M.

In the filament winding apparatus FW, the tension sensor 40 is provided with respect to each of the fiber bundles R running from the fiber bundle feeding package 20 to the tension applying portion 30. Only minimal tension that is sufficiently lower than the winding tension is applied to the fiber bundle R running from the fiber bundle feeding package 20 to the tension applying portion 30. Therefore, the tension sensor 40 can easily detect tension that has been increased due to an unwinding failure, or the like.

Accordingly, the filament winding apparatus FW can predict the breakage of the fiber bundles R and thus prevent the generation of defective products.

[Variation]

Embodiments of the present invention have been described above, however, the present invention may be modified and practiced as follows.

In the filament winding apparatus FW, the tension applying portion 30 that nips the fiber bundle R to apply the winding tension is used, however, the present invention is not limited to such a configuration. A tension applying portion using an active dancer system may be used which adjusts the winding tension by adjusting the weight of a dancer roll.

In the filament winding apparatus FW, the tension sensor 40 employing the strain gauge 45 is used, however, other well-known tension sensors such as a tension sensor employing a dancer roll or the like may be used.

While the present invention has been described with respect to embodiments thereof, it may be modified in numerous ways and may assume many embodiments other than those specifically set out and described above. Accordingly, the appended claims cover all modifications that fall within the true spirit and scope of the present invention.

What is claimed is:

1. A tension control system for fiber bundles in a filament winding apparatus that applies a winding tension to a fiber bundle unwound from a fiber bundle feeding package and winds the tension-applied fiber bundle around a mandrel, the filament winding apparatus comprising:
    a tension sensor that detects a tension of the unwound fiber bundle between the fiber bundle feeding package and a tension applying portion before the winding tension is applied;
    determination means that determines a tension abnormality of the fiber bundle by comparing pre-set reference information with a tension measured value measured by the tension sensor, wherein the determination means predicts when a fiber bundle breakage is to occur;
    control means that stops a process of winding the fiber bundle around the mandrel when the determination means determines the tension abnormality, wherein the control means stops the filament winding device before the occurrence of the fiber bundle breakage; and
    a tension measuring unit that measures a tension of the fiber bundle after the winding tension has been applied and transmits the measured tension to the control means,
    wherein the control means controls the tension applying portion in accordance with the measured tension received from the tension measuring unit so that the winding tension applied to the fiber bundle is controlled to be a prescribed winding tension.

2. The tension control system according to claim 1, wherein the determination means determines the tension abnormality when the tension measured value measured by the tension sensor exceeds a pre-set tension threshold value.

3. The tension control system according to claim 1, further comprising alerting means that generates an alert signal when the determination means determines the tension abnormality.

4. The tension control system according to claim 1, further comprising display means for the determination means to monitor the tension measured value acquired by the tension sensor by measuring the tension of each of the fiber bundles with respect to each of the fiber bundle feeding packages.

5. The tension control system according to claim 4, wherein the determination means determines the tension abnormality with respect to each of the fiber bundle feeding packages by comparing the tension measured value of the fiber bundle of each of the fiber bundle feeding packages with each other on the display means.

6. The tension control system according to claim 4, wherein the determination means determines the tension abnormality with respect to each of the fiber bundle feeding packages by comparing tension fluctuations of the fiber bundle of each of the fiber bundle feeding packages with each other on the display means.

7. The tension control system according to claim 4, wherein the determination means includes storage means that stores a previously measured sampling average value of the fiber bundle, and the determination means determines the tension abnormality by comparing, on the display means, the sampling average value with the tension measured value measured by the tension sensor.

8. The tension control system according to claim 4, wherein the determination means displays, for monitoring, the tension measured value of the fiber bundle on the display means as waveform information representing an amount of temporal fluctuations.

9. The tension control system according to claim 1, wherein the tension sensor comprises a strain gauge.

10. The tension control system according to claim 9, wherein the tension sensor further comprises:
    a guide wheel coaxially attached to a leading edge of a supporting rod that extends horizontally along a direction that is perpendicular to a running direction of the fiber bundle;
    an elastic plate attached to a rear edge of the supporting rod, wherein the strain gauge is attached to the elastic plate; and
    guide rollers below the guide wheel and supporting rod with space therebetween,
    wherein the fiber bundle is guided by the guide wheel and guide rollers while being flexed.

11. The tension control system according to claim 1, wherein the tension applying portion comprises an air pressure adjusting member.

12. The tension control system according to claim 11, wherein the air pressure adjusting member supplies air pressure to cause the fiber bundle to be nipped between first and second nipping members, thereby applying the prescribed winding tension.

13. The tension control system according to claim 12, wherein:
the first nipping member is a side wall of a frame of the tension applying portion; and
the second nipping member is a press roller that is moved by air pressure supplied by the air pressure adjusting member.

14. A method for controlling tension in a filament winding apparatus that applies a winding tension to a fiber bundle unwound from a fiber bundle feeding package and winds the tension-applied fiber bundle around a mandrel, the method comprising:
detecting with a detection sensor a tension of the unwound fiber bundle between the fiber bundle feeding package and a tension applying portion before the winding tension is applied;
determining when a fiber bundle breakage may occur by determining a tension abnormality of the fiber bundle by comparing pre-set reference information with a tension measured value measured by the tension sensor;
stopping a process of winding the fiber bundle around the mandrel when the tension abnormality is determined before the occurrence of the fiber bundle breakage;
measuring with a tension measuring unit a tension of the fiber bundle after the winding tension has been applied; and
controlling the winding tension applied to the fiber bundle in accordance with the tension measured by the tension measuring unit to be a prescribed winding tension.

15. The method for controlling tension according to claim 14, wherein the tension abnormality is determined when the tension measured value measured by the tension sensor exceeds a pre-set tension threshold value.

16. The method for controlling tension according to claim 14, further comprising generating an alert signal when the tension abnormality is determined.

17. The method for controlling tension according to claim 14, further comprising displaying the tension measured value acquired by measuring the tension of each of the fiber bundles with respect to each of the fiber bundle feeding packages.

18. The method for controlling tension according to claim 17, wherein the tension abnormality is determined with respect to each of the fiber bundle feeding packages by comparing the displayed tension measured value of the fiber bundle of each of the fiber bundle feeding packages with each other.

* * * * *